US009519616B2

(12) United States Patent
Frenkel et al.

(10) Patent No.: US 9,519,616 B2
(45) Date of Patent: *Dec. 13, 2016

(54) SECURE ARCHIVE

(71) Applicant: WATERFALL SECURITY SOLUTIONS LTD., Rosh HaAyin (IL)

(72) Inventors: Lior Frenkel, Moshav Misgav Dov (IL); Amir Zilberstein, Yad Rambam (IL)

(73) Assignee: WATERFALL SECURITY SOLUTION LTD., Rosh HaAyin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/800,708

(22) Filed: Jul. 16, 2015

(65) Prior Publication Data

US 2015/0326546 A1 Nov. 12, 2015

Related U.S. Application Data

(63) Continuation of application No. 14/248,419, filed on Apr. 9, 2014, now Pat. No. 9,116,857, which is a continuation of application No. 12/447,470, filed as application No. PCT/IL2008/000070 on Jan. 16, 2008, now Pat. No. 8,756,436.

(30) Foreign Application Priority Data

Jan. 16, 2007 (IL) .......................................... 180748

(51) Int. Cl.
*H04L 29/06* (2006.01)
*G06F 15/173* (2006.01)
*G06F 21/72* (2013.01)
*G06F 12/14* (2006.01)

(52) U.S. Cl.
CPC ...... *G06F 15/17331* (2013.01); *G06F 12/1408* (2013.01); *G06F 21/72* (2013.01); *H04L 63/0485* (2013.01); *G06F 2212/402* (2013.01)

(58) Field of Classification Search
CPC .... H04L 9/3215; H04L 63/0485; G06F 21/42; G06F 21/78; G06F 21/79; G06F 21/85; G06F 15/17331; G06F 21/72; G06F 12/1408; G06F 2212/402
USPC .......................... 713/193; 380/277; 711/163
See application file for complete search history.

(56) References Cited

U.S. PATENT DOCUMENTS

| 3,377,541 | A |   | 4/1968 | Farkas |             |
|-----------|---|---|--------|--------|-------------|
| 4,163,289 | A | * | 7/1979 | Schmidt | G06F 13/4018 |
|           |   |   |        |        | 327/583     |
| 4,213,177 | A | * | 7/1980 | Schmidt | G06F 13/4018 |
|           |   |   |        |        | 365/63      |
| 4,214,302 | A | * | 7/1980 | Schmidt | G06F 13/4018 |
|           |   |   |        |        | 365/63      |

(Continued)

OTHER PUBLICATIONS

U.S. Appl. No. 13/867,145 Office Action dated Aug. 14, 2015.
(Continued)

*Primary Examiner* — David García Cervetti
(74) *Attorney, Agent, or Firm* — D. Kligler IP Services Ltd.

(57) ABSTRACT

Storage apparatus (20) includes a memory (30) and an encryption processor (28), which is configured to receive and encrypt data transmitted from one or more computers (24) for storage in the memory. A one-way link (32) couples the encryption processor to the memory so as to enable the encryption processor to write the encrypted data to the memory but not to read from the memory.

22 Claims, 1 Drawing Sheet

(56) References Cited

U.S. PATENT DOCUMENTS

| | | | | |
|---|---|---|---|---|
| 4,375,665 A * | 3/1983 | Schmidt | G06F 13/4018 | 365/63 |
| 4,964,046 A * | 10/1990 | Mehrgardt | G06F 17/10 | 712/233 |
| 4,987,595 A * | 1/1991 | Marino, Jr. | G06F 21/79 | 713/164 |
| 5,140,681 A * | 8/1992 | Uchiyama | G06F 12/0815 | 365/189.14 |
| 5,163,138 A * | 11/1992 | Thirumalai | G06F 11/165 | 710/316 |
| 5,185,877 A * | 2/1993 | Bissett | G06F 11/076 | 710/22 |
| 5,289,478 A * | 2/1994 | Barlow | G06F 11/1008 | 714/770 |
| 5,530,758 A * | 6/1996 | Marino, Jr. | G06F 21/6218 | 713/150 |
| 5,677,952 A * | 10/1997 | Blakley, III | G06F 21/31 | 380/28 |
| 5,732,278 A * | 3/1998 | Furber | G06F 9/3802 | 710/35 |
| 5,748,871 A * | 5/1998 | DuLac | G06F 11/1076 | 348/E7.073 |
| 5,829,046 A * | 10/1998 | Tzelnic | G06F 12/0866 | 348/E5.008 |
| 5,940,507 A * | 8/1999 | Cane | G06F 21/602 | 380/277 |
| 5,946,399 A * | 8/1999 | Kitaj | G06F 21/602 | 365/230.06 |
| 5,995,628 A * | 11/1999 | Kitaj | G06F 21/74 | 380/2 |
| 6,167,459 A * | 12/2000 | Beardsley | G06F 13/102 | 710/3 |
| 6,170,023 B1 * | 1/2001 | Beardsley | G06F 12/06 | 710/3 |
| 6,185,638 B1 * | 2/2001 | Beardsley | G06F 13/387 | 710/3 |
| 6,202,095 B1 * | 3/2001 | Beardsley | G06F 9/5044 | 709/201 |
| 6,239,810 B1 * | 5/2001 | Van Hook | A63F 13/00 | 345/420 |
| 6,356,546 B1 | 3/2002 | Beshai | | |
| 6,467,009 B1 * | 10/2002 | Winegarden | G06F 13/4217 | 710/305 |
| 6,574,640 B1 * | 6/2003 | Stahl | G06F 17/30011 | 707/661 |
| 6,601,126 B1 * | 7/2003 | Zaidi | G06F 15/7832 | 710/100 |
| 6,615,244 B1 * | 9/2003 | Singhal | G06F 17/3089 | 707/E17.116 |
| 6,640,308 B1 | 10/2003 | Keyghobad et al. | | |
| 6,754,185 B1 | 6/2004 | Banerjee et al. | | |
| 6,820,110 B1 | 11/2004 | Engel et al. | | |
| 6,862,663 B1 * | 3/2005 | Bateman | G06F 12/126 | 711/100 |
| 6,915,369 B1 * | 7/2005 | Dao | G06F 15/8007 | 375/E7.093 |
| 6,915,435 B1 * | 7/2005 | Merriam | G06F 17/30085 | 707/E17.005 |
| 6,957,330 B1 * | 10/2005 | Hughes | G06F 21/6218 | 713/162 |
| 6,966,001 B2 * | 11/2005 | Obara | H04L 67/42 | 713/193 |
| 7,062,587 B2 * | 6/2006 | Zaidi | G06F 15/7832 | 710/100 |
| 7,171,566 B2 * | 1/2007 | Durrant | G06F 12/1408 | 380/255 |
| 7,200,693 B2 * | 4/2007 | Jeddeloh | G11C 7/1072 | 710/22 |
| 7,254,663 B2 * | 8/2007 | Bartley | G06F 11/2007 | 710/305 |
| 7,269,704 B2 * | 9/2007 | Matulik | G06F 13/4243 | 710/3 |
| 7,441,102 B2 * | 10/2008 | Shade | G06F 9/268 | 712/205 |
| 7,469,311 B1 | 12/2008 | Tsu et al. | | |
| 7,509,141 B1 * | 3/2009 | Koenck | G06F 13/4256 | 370/387 |
| 7,660,959 B2 * | 2/2010 | Asher | G06F 21/78 | 711/164 |
| 7,685,436 B2 * | 3/2010 | Davis | G06F 21/72 | 713/153 |
| 7,698,470 B2 * | 4/2010 | Ruckerbauer | G11C 5/02 | 326/38 |
| 7,761,529 B2 * | 7/2010 | Choubal | G06F 13/1605 | 370/351 |
| 7,761,704 B2 * | 7/2010 | Ho | H04N 5/913 | 380/201 |
| 7,792,300 B1 * | 9/2010 | Caronni | G06Q 20/3829 | 380/259 |
| 7,814,316 B1 * | 10/2010 | Hughes | G06F 21/72 | 713/160 |
| 7,815,548 B2 * | 10/2010 | Barre | A63B 24/00 | 482/8 |
| 7,845,011 B2 * | 11/2010 | Hirai | G06F 21/10 | 380/201 |
| 7,849,330 B2 * | 12/2010 | Osaki | G06F 21/6245 | 713/165 |
| 8,756,436 B2 * | 6/2014 | Frenkel | H04L 63/0485 | 713/193 |
| 2002/0065775 A1 * | 5/2002 | Monaghan | G06Q 20/1085 | 705/43 |
| 2002/0083120 A1 * | 6/2002 | Soltis | G06F 3/0605 | 709/200 |
| 2002/0186839 A1 * | 12/2002 | Parker | H04L 9/065 | 380/37 |
| 2003/0037247 A1 * | 2/2003 | Obara | H04L 67/42 | 713/193 |
| 2003/0039354 A1 * | 2/2003 | Kimble | G06F 5/10 | 380/37 |
| 2003/0140239 A1 * | 7/2003 | Kuroiwa | G11B 20/00086 | 713/193 |
| 2003/0188102 A1 * | 10/2003 | Nagasoe | G06F 11/1076 | 711/114 |
| 2003/0212845 A1 * | 11/2003 | Court | G06F 13/387 | 710/305 |
| 2004/0022107 A1 * | 2/2004 | Zaidi | G06F 15/7832 | 365/202 |
| 2005/0119967 A1 * | 6/2005 | Ishiguro | G06F 21/10 | 705/38 |
| 2005/0120251 A1 * | 6/2005 | Fukumori | G06F 1/30 | 713/300 |
| 2005/0216648 A1 * | 9/2005 | Jeddeloh | G06F 13/4022 | 710/311 |
| 2005/0270840 A1 * | 12/2005 | Kudelski | G06Q 20/341 | 365/185.04 |
| 2006/0047887 A1 * | 3/2006 | Jeddeloh | G11C 7/1072 | 711/100 |
| 2006/0064550 A1 * | 3/2006 | Katsuragi | G06F 3/0605 | 711/141 |
| 2006/0085354 A1 * | 4/2006 | Hirai | G06F 21/10 | 705/59 |
| 2006/0095629 A1 * | 5/2006 | Gower | G06F 13/4243 | 710/305 |
| 2006/0179208 A1 * | 8/2006 | Jeddeloh | G06F 13/4022 | 711/100 |
| 2006/0195704 A1 * | 8/2006 | Cochran | G06F 11/1666 | 713/193 |
| 2006/0224848 A1 * | 10/2006 | Matulik | G06F 13/4243 | 711/167 |
| 2006/0259431 A1 * | 11/2006 | Poisner | G06F 21/126 | 705/51 |
| 2006/0288010 A1 * | 12/2006 | Chen | G06F 21/41 | |
| 2006/0294295 A1 * | 12/2006 | Fukuzo | G06F 13/1673 | 711/105 |
| 2007/0028027 A1 * | 2/2007 | Janzen | G06F 13/1684 | 711/5 |
| 2007/0043769 A1 * | 2/2007 | Kasahara | H04L 9/0822 | |

(56) References Cited

U.S. PATENT DOCUMENTS

| | | | |
|---|---|---|---|
| 2007/0055814 A1* | 3/2007 | Jeddeloh | G11C 7/1072 711/100 |
| 2007/0174362 A1* | 7/2007 | Pham | G06F 21/6209 |
| 2007/0204140 A1* | 8/2007 | Shade | G06F 9/268 712/220 |
| 2007/0283297 A1* | 12/2007 | Hein | G11C 7/22 716/100 |
| 2008/0066192 A1* | 3/2008 | Greco | G06F 21/6209 726/32 |
| 2008/0082835 A1* | 4/2008 | Asher | G06F 21/78 713/193 |
| 2008/0155273 A1* | 6/2008 | Conti | G06F 12/1425 713/190 |
| 2009/0019325 A1* | 1/2009 | Miyamoto | G06F 11/1008 714/702 |
| 2010/0275039 A1* | 10/2010 | Frenkel | H04L 63/0485 713/193 |
| 2011/0107023 A1* | 5/2011 | McCallister | G06F 3/0608 711/111 |
| 2011/0213990 A1* | 9/2011 | Poisner | G06F 21/126 713/193 |
| 2011/0276699 A1 | 11/2011 | Pedersen | |
| 2012/0198225 A1 | 8/2012 | Gadouche et al. | |
| 2013/0024700 A1* | 1/2013 | Peterson | H03M 7/30 713/189 |
| 2013/0152206 A1 | 6/2013 | Staubly | |
| 2013/0179685 A1 | 7/2013 | Weinstein et al. | |
| 2013/0326132 A1* | 12/2013 | Jeddeloh | G06F 13/4243 711/105 |
| 2014/0020109 A1 | 1/2014 | Mraz et al. | |
| 2014/0040679 A1* | 2/2014 | Shimizu | G06F 11/1666 714/54 |
| 2014/0068712 A1 | 3/2014 | Frenkel et al. | |
| 2014/0122965 A1* | 5/2014 | Zeng | H03M 13/27 714/758 |
| 2014/0282215 A1 | 9/2014 | Grubbs et al. | |
| 2015/0135264 A1 | 5/2015 | Amiga | |

OTHER PUBLICATIONS

European Application # 15179410.4 Search Report dated Feb. 26, 2016.
U.S. Appl. No. 13/604,677 Office Action dated Feb. 11, 2016.
U.S. Appl. No. 13/867,145 Office Action dated Feb. 26, 2016.
IEEE Standards Information Network, "The Authoritative Dictionary of IEEE Terms", IEEE Press, 7th Edition, p. 1154, 2000.

* cited by examiner

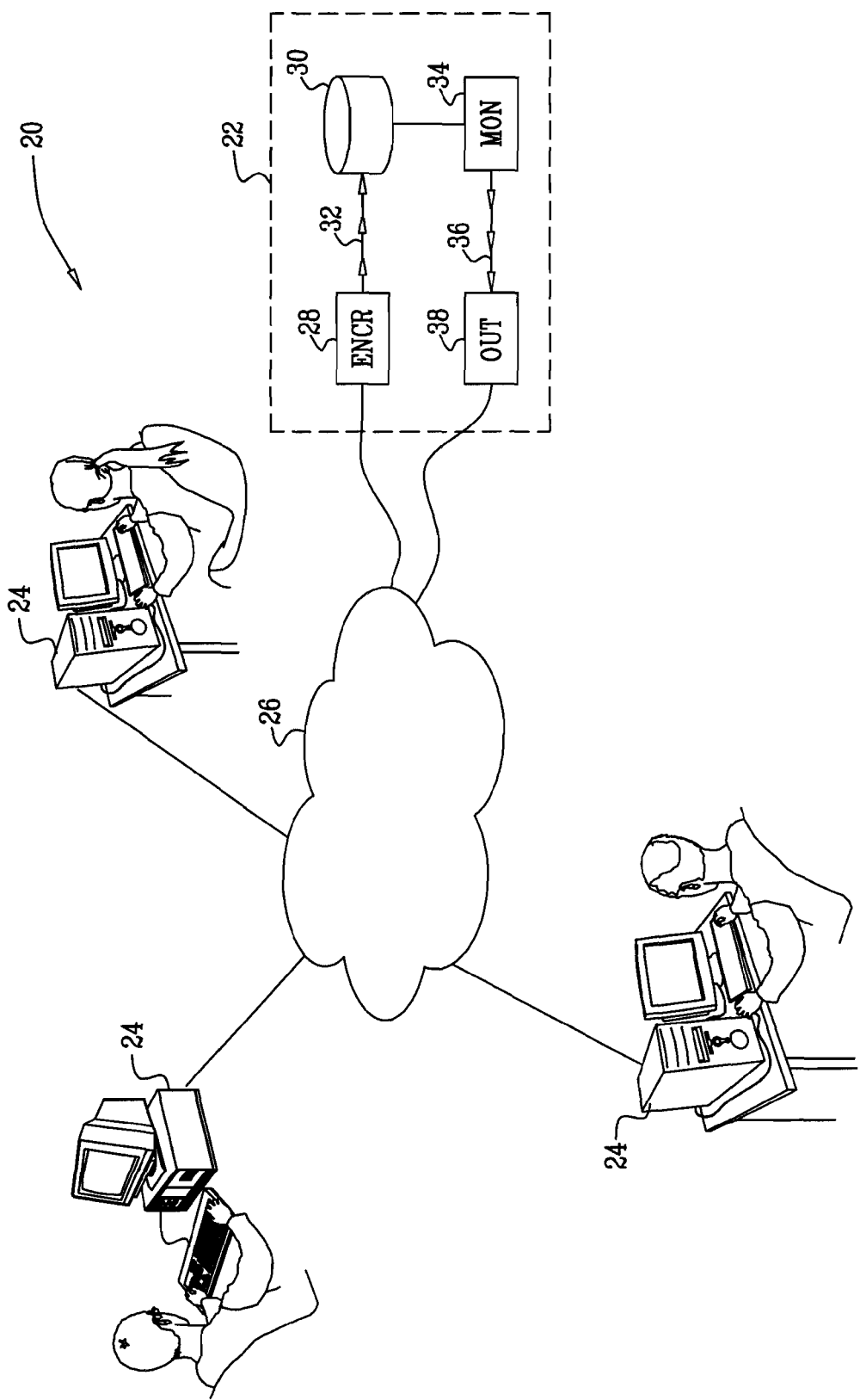

SECURE ARCHIVE

CROSS-REFERENCE TO RELATED APPLICATION

This application is a continuation of U.S. patent application Ser. No. 14/248,419, now U.S. Pat. No. 9,116,857, which is a continuation of U.S. patent application Ser. No. 12/447,470, now U.S. Pat. No. 8,756,436, filed Apr. 28, 2009, as the national phase of PCT patent application PCT/IL2008/000070, filed Jan. 16, 2008, published as PCT Publication WO 2008/087640.

FIELD OF THE INVENTION

The present invention relates generally to computer systems, and specifically to systems and methods for data communication and storage.

BACKGROUND OF THE INVENTION

In a computer network handling sensitive data, such as data in military or financial environments, portions of the network may be connected by one-way data links. For example, confidential data that must not be accessed from external sites may be stored on a computer that is configured to receive data over a one-way link and has no physical outgoing link over which data might be transmitted to the external site.

One-way links may be implemented, for example, using Waterfall™ systems, which are manufactured by Gita Technologies, Ltd. (Rosh HaAyin, Israel). Specifications of Waterfall systems are available at www.waterfall.co.il. The Waterfall system provides a physical one-way connection based on fiberoptic communication, using an underlying proprietary transfer protocol. When a transmitting computer is connected by a Waterfall system (or other one-way link) to a receiving computer, the receiving computer can receive data from the transmitting computer but has no means of sending any return communications to the transmitting computer.

SUMMARY OF THE INVENTION

Networked computing systems, such as enterprise computer networks, often use centralized storage for archiving of data, such as transaction logs, information technology (IT) system events, and backups. Maintaining the integrity of such archives is crucial in order to ensure that functions such as log analysis, audits, forensics, and data recovery after system failures can be carried out. It is also necessary to prevent unauthorized parties from accessing sensitive archived data.

The embodiments of the present invention that are described hereinbelow address these needs by providing a secure storage system, in which computers on a network can write data to a memory only via an encryption processor. (The term "memory" is used broadly in the present patent application and in the claims to refer to any sort of data storage medium.) The processor encrypts the data using an encryption key, which typically is not available to the source computers, and conveys the encrypted data over a one-way link to the memory. Thus, the encryption processor is able to write encrypted data to the memory but not to read from the memory.

Since all data written to the memory are encrypted, any malicious program code that a hacker may attempt to introduce into the storage system is scrambled and therefore rendered harmless until it is decrypted. Decryption may take place in a controlled, "sterile" environment, in which malicious code can be detected and neutralized before it affects vulnerable network elements. For example, the storage contents may be duplicated and then decrypted in an environment that is separate from the storage system, so that any damage that may be caused by malicious code will not affect the original stored data.

There is therefore provided, in accordance with an embodiment of the present invention, storage apparatus, including:

a memory;

an encryption processor, which is configured to receive and encrypt data transmitted from one or more computers for storage in the memory; and a one-way link, coupling the encryption processor to the memory so as to enable the encryption processor to write the encrypted data to the memory but not to read from the memory.

In some embodiments, the encryption processor is configured to encrypt the data using an encryption key that is not available to the one or more computers. In one embodiment, for each transmission of the data from the one or more computers, the encryption processor is configured to select the encryption key from among a plurality of possible encryption keys, and to convey an indication of the selected encryption key to the memory in addition to the encrypted data.

Typically, the memory is configured to store the encrypted data without decryption prior to storage.

In a disclosed embodiment, the encryption processor is configured to receive the data from the one or more computers over a network and to apply a time stamp to each of at least some items of the data that are written to the memory.

In some embodiments, the apparatus includes a monitoring processor, which is coupled to the memory so as to generate an indication of a status of the data stored in the memory, and a further one-way link, coupling the monitoring processor to at least one of the computers so as to enable the monitoring processor to convey the indication of the status to the at least one of the computers but not to receive inputs from the one or more computers.

There is also provided, in accordance with an embodiment of the present invention, a method for data storage, including:

receiving data transmitted from one or more computers for storage in a memory;

encrypting the received data using an encryption processor before passing the data to the memory;

conveying the encrypted data from the encryption processor to the memory over a one-way link, which permits the encryption processor to write the encrypted data to the memory but not to read from the memory; and storing the encrypted data in the memory.

The present invention will be more fully understood from the following detailed description of the embodiments thereof, taken together with the drawings in which:

BRIEF DESCRIPTION OF THE DRAWINGS

FIG. 1 is a block diagram that schematically illustrates a system for data transmission and storage, in accordance with an embodiment of the present invention.

DETAILED DESCRIPTION OF EMBODIMENTS

FIG. 1 is a block diagram that schematically illustrates a system 20 for data transmission and storage, in accordance with an embodiment of the present invention. Computers 24 in system 20 write data to a secure archive 22 via a computer network 26. These data may comprise, for example, transaction logs or other data logging entries, database updates, file backups, or substantially any other type of data that may be subject to archiving. Network 26 may comprise substantially any sort of private or public network. (In an alternative embodiment, not shown in the figures, archive 22 may be connected by a single link rather than through a multi-computer network.) Even when access to network 26 is carefully controlled, however, unauthorized users may still be able to gain access to the network. Such users may attempt to introduce malicious program code into archive 22 in order to read data stored in the archive or to corrupt the contents of the archive. For example, an attacker who has hacked into the network might try to erase or alter the IT system log in order to cover his tracks.

Archive 22 comprises an encryption processor 28, which writes encrypted data to a memory 30 via a one-way link 32. Computers on network 26 are able to write data to memory 30 only via the encryption processor. Therefore, any malicious program code that a user may attempt to introduce into archive 22 will be scrambled by encryption and will simply be stored in scrambled form in memory 30. Consequently, the user will be unable to cause the control unit of memory 30 to perform any action other than simply writing data to the memory, since any program instructions submitted by the user will be rendered unintelligible by the encryption.

Encryption processor 28 may comprise either dedicated hardware or a general-purpose, software-driven computer processor, or a combination of hardware and software elements. For rapid encryption, as well as enhanced security, for example, the encryption processor may comprise one or more gate arrays with suitable firmware and/or an application-specific integrated circuit (ASIC). If a general-purpose computer processor is used, the software for carrying out the functions described herein may be downloaded to the processor over a network, or it may be alternatively provided on tangible media, such as optical, magnetic, or electronic memory media.

The encryption processor may use any suitable sort of encryption that is known in the art, including both asymmetric encryption methods, such as the RSA (Rivest Shamir Adelman) algorithm, and symmetric methods, such as the DES (Data Encryption Standard) and AES (Advanced Encryption Standard) algorithms, as well as simpler methods, which are sometimes referred to as "scrambling." In encrypting incoming data, the encryption processor typically uses different keys at different times, and may use a key that is not available to computers outside archive 22. Because of the changing keys, hackers are prevented from using a known key to prepare their transmissions in such a way as to have malicious effect after encoding. Typically, the encryption processor chooses the key for each data item or group of data items using a pseudo-random process, either by selection from a list that was prepared in advance, or by pseudo-random generation. (Alternatively, the key may be chosen deterministically, as long as it is not known or available to the sending computer.) The key may be of any suitable length, depending on the encryption algorithm that is used.

Encryption processor 28 transmits the encrypted data over one-way link 32 to memory 30. Assuming that the encryption processor uses different encryption keys at different times, the encryption processor may also transmit to the memory an indication of the key that is to be used to decrypt each transmission. The indication may comprise either the key itself or an index to a predetermined list of keys. Optionally, either the encryption processor or the memory controller (or both) may add a time-stamp to each item of data, in order to facilitate audit functions. Alternatively or additionally, the time stamp may be applied by a dedicated hardware unit.

One-way link 32 may comprise a Waterfall link, as described in the Background section above, or any other suitable type of one-way link that is known in the art. As noted above, this link is typically physically configured so as to permit data transmission in only one direction, from processor 28 to memory 30. Optionally, link 32 may comprise two or more one-way links connected in series, with a data security engine placed between the one-way links. This link configuration, which provides enhanced security, is described, for example, in PCT Patent Publication WO 2008/001344, filed Dec. 28, 2006, which is assigned to the assignee of the present patent application and whose disclosure is incorporated herein by reference.

Memory 30 may comprise any suitable type of storage device, such as magnetic, optical, or electronic memory, or a combination of these memory types. The storage device may comprise a control unit (not shown), as is known in the art, which receives the encrypted data over link 32 and writes the data to appropriate locations in the memory. As noted above, however, the control unit does not attempt to decrypt the data before writing. Rather, the data are typically decrypted and "sterilized" offline, as needed, by a separate decryption processor (not shown). To decrypt the data, this processor uses the key that was indicated by the encryption processor, as explained above. After decryption, the decryption processor sterilizes the data in order to detect and neutralize any malicious content, such as viruses, worms and spyware, for example. Methods that can be used for encryption and decryption of potentially-malicious data transmissions are described in greater detail in PCT Patent Publication WO 2008/026212, filed Aug. 29, 2007, which is assigned to the assignee of the present patent application and whose disclosure is incorporated herein by reference.

Some archiving applications may require archive 22 to return an acknowledgment or other status indicator to one or more of computers 24 after receiving data from the computer. Simple data acknowledgments may be returned by encryption processor 28. Alternatively or additionally, an optional monitoring processor 34 may monitor the status of memory 30 and report on data storage status. Typically, the monitoring processor is pre-programmed to carry out these functions and performs the functions without receiving explicit commands to do so from computers on network 26. Monitoring processor 34 conveys the reports via a one-way link 36 to an output interface 38, which then transmits the reports to the appropriate computer 24 on network 26. In this configuration, computers 24 are unable to send inputs, such as data or commands, to the monitoring processor, and are thus prevented from introducing malicious program code that could cause this processor to retrieve and transmit confidential data from memory 30 or otherwise tamper with the contents of the memory.

Although FIG. 1 shows a certain configuration of system 20 and particularly of the elements in archive 22, the principles of the present invention may similarly be applied in other sorts of physical configurations. For example, links 32 and 36 may be combined in a single package with appropriate connections and switching to ensure that data flows over the links only in the directions and operational modes that are described above. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Storage apparatus, comprising:
  a memory;
  an encryption processor, which is configured to receive and encrypt data transmitted from one or more computers for storage in the memory; and
  a one-way link, coupling the encryption processor to the memory so as to enable the encryption processor to write the data to the memory but not to read from the memory,
  wherein the one-way link is physically configured so as to permit data transmission in only one direction, from the encryption processor to the memory, and
  wherein the memory and the encryption processor are connected in a manner allowing direct data flow only from the encryption processor to the memory, and not allowing direct flow of data from the memory to the encryption processor.

2. The apparatus according to claim 1, wherein the encryption processor is configured to encrypt the data using an encryption key that is not available to the one or more computers.

3. The apparatus according to claim 2, wherein for each transmission of the data from the one or more computers, the encryption processor is configured to select the encryption key from among a plurality of possible encryption keys, and to convey an indication of the selected encryption key to the memory in addition to the encrypted data.

4. The apparatus according to claim 1, wherein the memory is configured to store the encrypted data without decryption prior to storage.

5. The apparatus according to claim 1, wherein the encryption processor is configured to receive the data from the one or more computers over a network.

6. The apparatus according to claim 1, wherein the encryption processor is configured to apply a time stamp to each of at least some items of the data that are written to the memory.

7. The apparatus according to claim 1, and comprising:
  a monitoring processor, which is coupled to the memory so as to generate an indication of a status of the data stored in the memory; and
  a further one-way link, coupling the monitoring processor to at least one of the computers so as to enable the monitoring processor to convey the indication of the status to the at least one of the computers separate from the encryption processor but not to receive inputs from the one or more computers.

8. The apparatus according to claim 1, comprising an additional one way link included in a communication path allowing transmission from the memory to at least one of the computers, without the communication path passing through the encryption processor.

9. The apparatus according to claim 1, comprising a monitoring processor separate from the encryption processor, which monitors the status of the memory.

10. The apparatus according to claim 1, wherein the memory comprises a centralized archiving storage of a network.

11. The apparatus according to claim 1, wherein the memory is configured to only receive data through the encryption processor.

12. The apparatus according to claim 1, wherein the memory is located within a private protected computer network such that data can be transmitted to the memory only from computers within the private protected network.

13. A method for data storage, comprising:
  receiving data transmitted from one or more computers for storage in a memory;
  encrypting the received data using an encryption processor before passing the data to the memory;
  conveying the encrypted data from the encryption processor to the memory over a one-way link, which permits the encryption processor to write the encrypted data to the memory but not to read from the memory,
  wherein the one-way link is physically configured so as to permit data transmission in only one direction, from the encryption processor to the memory, and wherein the memory and the encryption processor are connected in a manner allowing direct data flow only from the encryption processor to the memory, and not allowing direct flow of data from the memory to the encryption processor; and
  storing the encrypted data in the memory.

14. The method according to claim 13, wherein encrypting the received data comprises encrypting the data using an encryption key that is not available to the one or more computers.

15. The method according to claim 14, wherein encrypting the data comprises, for each transmission of the data from the one or more computers, selecting the encryption key from among a plurality of possible encryption keys, and conveying an indication of the selected encryption key to the memory in addition to the encrypted data.

16. The method according to claim 13, wherein storing the encrypted data comprises writing the encrypted data to the memory without decryption prior to storage.

17. The method according to claim 13, wherein receiving the data comprises receiving the data from the one or more computers over a network.

18. The method according to claim 13, and comprising applying a time stamp to each of at least some items of the data that are written to the memory, by the encryption processor.

19. The method according to claim 13, and comprising:
  generating an indication of a status of the data stored in the memory using a monitoring processor coupled to the memory; and
  conveying the indication from the monitoring processor to a computer separate from the encryption processor via a further one-way link, which permits the monitoring processor so to convey the indication of the status to the computer but not to receive inputs from the computer.

20. The method according to claim 13, wherein receiving the data comprises receiving transaction logs from the plurality of computers.

21. The method according to claim 13, wherein receiving the data comprises receiving file backups from the plurality of computers.

22. The method according to claim 13, wherein the memory is configured to only receive data through the encryption processor.

* * * * *